3,241,717
LEVEL CONTROL
Lloyd V. Fegan, Jr., Lebanon, Pa., assignor, by mesne assignments, to Bethlehem Steel Corporation, a corporation of Delaware
Filed Dec. 16, 1964, Ser. No. 418,597
28 Claims. (Cl. 222—55)

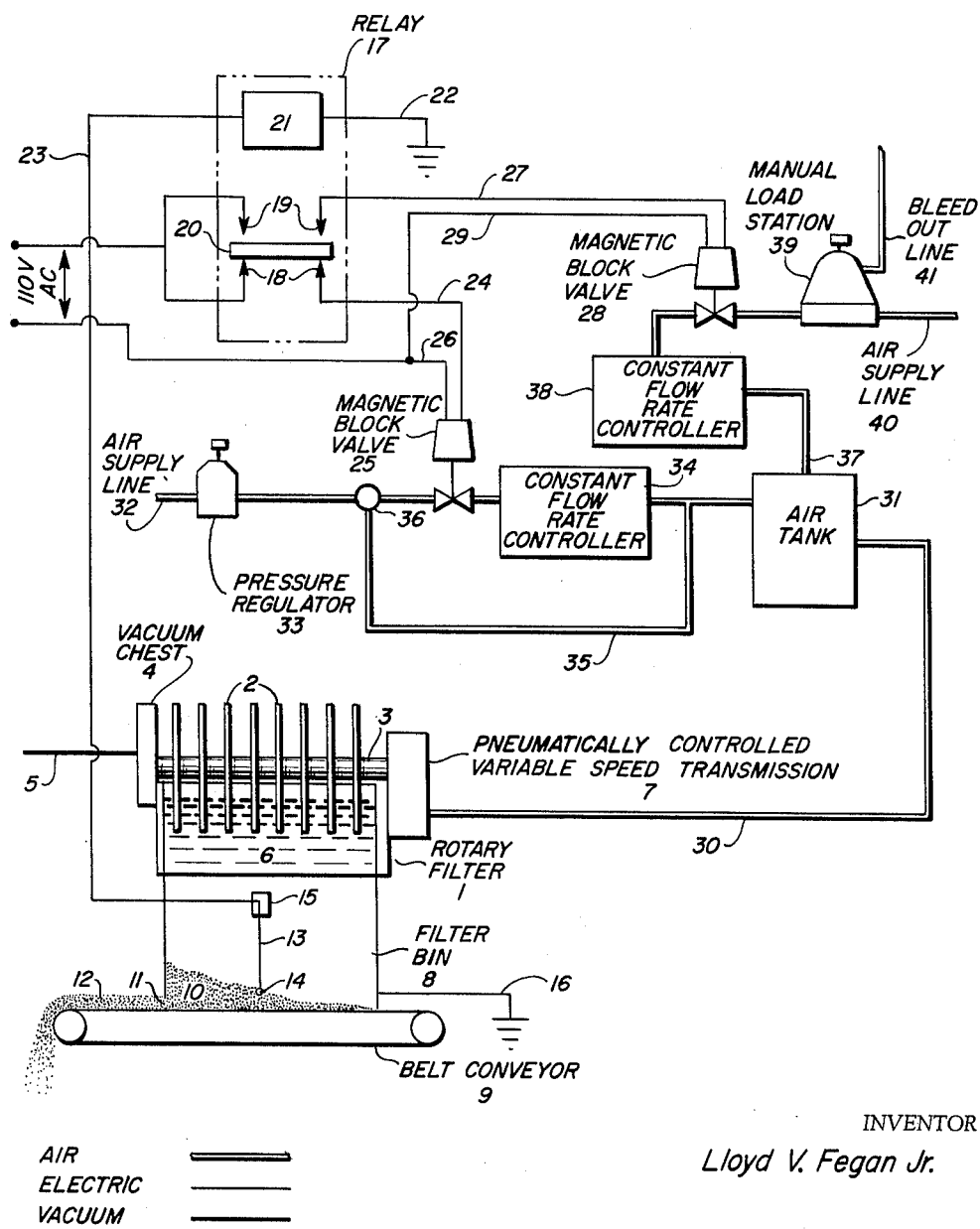

This invention relates broadly to speed control apparatus. Specifically, this invention relates to apparatus for controlling the rate at which material is fed into or withdrawn from a bin or hopper. Even more specifically, this invention relates to apparatus for controlling the level of filter cake in a filter bin associated with a rotary filter by regulating the speed of rotation of the rotary filter.

Rotary filters, for example the "American" type (Chemical Engineers' Handbook, third edition, page 981), are superposed over a filter bin for the collection of filter cake therein, and are driven by a variable speed transmission which may have a pneumatically operated speed control. For several reasons, it may be desired to maintain a constant level of filter cake in the bin, and this may be done by regulating the speed of rotation of the rotary filter through suitable adjustment of the variable speed transmission therefor.

Conventional filter bin level control systems employ two probes in the filter bin to make or break electrical contact with the filter cake therein, one of these probes being a "high level" probe and the other a "low level" probe. Such conventional systems require relatively expensive control instruments and will maintain the level of filter cake in the filter bin within the range from high level to low level as determined by the two above mentioned probes. For several reasons, including a lack of desired accuracy in the maintenance of the level of filter cake in the filter bin, these conventional systems are not entirely satisfactory.

The present invention, broadly speaking, employs only one probe in the filter bin and, through a particular combination of electric-relay-operated magnetic block valves and constant flow rate controllers alternately bleeding air in and out of the air circuit leading to the pneumatically operated speed control for the variable speed transmission of the rotary filter, a more accurate and reliable maintenance of bin level in the filter bin is realized.

One of the objects of this invention is to provide speed control apparatus.

A further object of this invention is to provide apparatus for controlling the level of filter cake in a into or removed from a bin or hopper.

Another object of this invention is to provide apparatus for controlling the speed of rotation of a rotary filter.

Another object of this invention is to provide apparatus for controlling the level of filter cake in a filter bin associated with a rotary filter by regulating the speed of rotation of the rotary filter.

A further object of this invention is to provide apparatus for controlling the level of filter cake in a filter bin associated with a rotary filter, which apparatus employs only a single probe in the filter bin and which apparatus is accurate and reliable.

Yet a further object of this invention is to provide apparatus for controlilng the level of filter cake in a filter bin associated with a rotary filter having a pneumatically operated speed control, which apparatus employs constant flow rate controllers bleeding air in and out of the air circuit leading to the said pneumatically operated speed control.

Other and further objects of this invention will become apparent during the course of the following description and by reference to the accompanying drawing and the appended claims.

The single figure of the accompanying drawing represents schematically the filter bin level control and shows diagrammatically and in vertical elevation certain of the apparatus employed therewith.

Rotary filter 1 may, by way of example and not limitation, be a continuous vacuum "American" filter, having filter discs 2 mounted to hollow shaft 3, and vacuum chest 4 served by vacuum line 5 and communicating through the hollow shaft 3 with the interiors of the filter discs 2. Slurry to be filtered is introduced into the feed tank 6 through a suitable conduit (not shown). Hollow shaft 3 and filter discs 2 connected thereto are rotated by pneumatically controlled infinitely variable speed transmission 7 as of the Reeves type.

Filter bin 8 is mounted below rotary filter 1, is open at its bottom, and overlies belt conveyor 9. Filter bin 8 receives filter cake 10 removed from filter discs 2, and belt conveyor 9 withdraws said filter cake 10, from filter bin 8 through opening 11 in one vertical wall of filter bin 8, whereby a bed 12 of uniform height is provided on belt conveyor 9.

In the preferred embodiment, free-swinging, non-rigid electrically conductive insulated wire or cable 13, with electrically conductive weight or bob 14 secured to the lower end thereof, is suspended in filter bin 8 by means of insulated support 15, with bob 14 placed at the desired height above the belt conveyor 9. Filter bin 8 is indicated as electrically grounded by lead 16.

A conventional relay 17, indicated only diagrammatically and bounded by phantom lines in the accompanying figure, comprises a pair of first treminals 18 and a pair of second terminals 19, a contact element 20 adapted to electrically connect said pair of first terminals 18 or said pair of second terminals 19, said contact element 20 being biased in such a direction as to electrically connect said pair of first terminals 18, and electromagnetic means 21 which, when energized, urges said contact element 20 away from electrical contact with said pair of first terminals 18 and to such a position as to electrically connect said pair of second terminals 19. Electromagnetic means 21 is energized upon completion of the circuit between the said means, bob 14 and filter cake 10, and is deenergized when this circuit is broken. As shown only diagrammatically, the circuit includes lead 22 connecting to a ground common to grounding lead 16, and lead 23 connecting to cable 13. Instead of the separate grounding leads 16 and 22 for filter bin 8 and electromagnetic means 21 it will be understood that another lead running between the two may be employed if desired. The circuit between electromagnetic means 21 and filter cake 10 is preferably not operated on full line voltage but rather on reduced voltage such as 9–10 volts to avoid excessive stray currents from interfering with other apparatus associated with filter bin 8 and belt conveyor 9. It will be apparent that the filter cake 10 in filter bin 8 must be, to some substantial degree, electrically conductive. Thus, when bob 14 makes contact with the surface of the filter cake 10 (i.e., the level of filter cake 10 in filter bin 8 rises above the desired value), the energizing circuit for electromagnetic means 21 is completed and contact element 20 electrically connects the pair of second terminals 19. And, when bob 14 breaks contact with the surface of the filter cake 10 (i.e., the level of filter cake 10 in filter bin 8 falls below the desired value), and the energizing circuit for electromagnetic means 21 is broken and contact element 20 electrically connects the pair of first terminals 18.

One each of said terminals 18 and 19 is connected to one side of a source of electrical power. The other terminal 18 is connected through lead 24 with one side of the circuit actuating magnetic block valve 25, the other side of the circuit therefore being connected through lead 26 with the other side of the source of electrical power. The other terminal 19 is connected through lead 27 with one side of the circuit actuating magnetic block valve 28 the other side of the circuit therefor being connected by lead 29 with the other side of the source of electrical power. When the actuating circuits for magnetic block valves 25 and 28 are closed (contact element 20 connecting the pair of first terminals 18 or the pair of second terminals 19, respectively), valves 25 and 28 are fully open, and when the actuating circuits are open, valves 25 and 28 are fully closed. It will be apparent that when one of the valves 25 or 28 is open, the other valve 28 or 25 will be closed.

Pneumatically controlled (i.e., fluid-pressure operated) variable speed transmission 7 is connected through line 30 with air tank 31. The pressure of air in air tank 31 determines the setting of variable speed transmission 7 and hence the speed of rotation of filter discs 2 in filter 1. When the air pressure in air tank 31 rises, the speed of rotation of filter disc 2 increases, and conversely, when the air pressure in tank 31 falls, the speed of rotation of filter discs 2 decreases.

Magnetic block valve 25 opens or closes air supply line 32 leading to air tank 31. In line with accepted practice, pressure regulator 33 is placed in air supply line 32 to reduce the pressure of air from a source of compressed air (not shown) to a proper working value which, in this case, would be approximately 15 p.s.i. Conventional constant flow rate controller 34 is interposed between magnetic block valve 25 and air tank 31, in air supply line 32. Constant flow rate controller 34 is, essentially, a bleed valve having a bleed, or low-flow, rate which is adjustable and which, when adjusted to a particular value, remains constant at the selected valve regardless of changes in pressure drop across the said regulator. Conventionally, constant flow rate controller 34 includes an indicating flow meter which indicates the flow rate therethrough. Air supply line 32 is provided with a bypass line 35 jumping magnetic block valve 25 and bleed regulator 34, and with three-way valve 36 which is normally closed to bypass line 35 and opened to magnetic block valve 25 but which may be opened to bypass line 35 and closed to magnetic block valve 25 for startup as hereinafter described or for operation in case of emergency or repairs.

Magnetic block valve 28 opens or closes air discharge line 37 from air tank 31. Conventional constant flow rate controller 38, similar to constant flow rate controller 34, is interposed between magnetic block valve 28 and air tank 31, in air discharge line 37 as shown. It is desirable to maintain a minimum pressure in air discharge line 37, and hence in air tank 31, for reasons which will hereinafter appear, and for this purpose air discharge line 37 communicates with manual load station 39, the latter being, essentially, a relief valve providing the desired back pressure in air discharge line 37. In the particular type of manual load station 39 shown, the normal instrument air pressure of 15 p.s.i. from air supply line 40 is reduced to the selected value of the desired back or minimum pressure in air discharge line 37 (in the present case, 3 p.s.i.) and applied to one side of a diaphragm. In order for air from air discharge line 37 to escape through the bleed out line 41, it must apply to the other side of the diaphragm a pressure greater than that on the first-mentioned side thereof. Obviously, as air tank 31 has initially been filled with air at a pressure above 3 p.s.i. and which, in fact, may be as high as 15 p.s.i., the pressure in air discharge line 37 and air tank 31 cannot fall below 3 p.s.i. in the present case. It will, of course, be understood that other means may be employed to maintain a desired minimum pressure in the air discharge line 37 and air tank 31.

The operation of the present invention will now be described.

In starting up the system, with no filter cake 10 in filter bin 8, three way valve 36 is opened to bypass line 35 and closed to magnetic block valve 25 to pressurize air tank 31, whereby the pneumatically controlled variable speed transmission 7 of rotary filter 1 is adjusted, preferably to rotate filter discs 2 at their maximum speed to quickly bring the level of filter cake 10 up to contact with bob 14, while belt conveyor 9 continuously withdraws filter cake 10 from filter bin 8. Then, three way valve 36 is closed to bypass line 35 and opened to magnetic block valve 25, whereupon the level of filter cake 10 is maintained by the alternate automatic operation of magnetic block valves 25 and 28 respectively increasing and decreasing the rate of rotation of filter discs 2. As the level of the filter cake 10 in filter bin 8 drops and loses contact with bob 14, the circuit between the pair of first terminals 18 is completed, magnetic block valve 25 is opened, and air bleeds into air tank 31 to raise the pressure therein, thereby to increase the speed of rotation of filter discs 2 and increase the rate of production of filter cake 10 until the level of filter cake 10 rises to contact bob 14. Thereupon, the circuit between the pair of first terminals 18 is broken and magnetic block valve 25 closes, and the circuit between the pair of second terminals 19 is completed to open magnetic block valve 28, permitting air to bleed out of air tank 31 and reducing the pressure therein to lower the speed of rotation of filter discs 2 and decrease the rate of production of filter cake 10 until bob 14 loses contact with the surface thereof. At equilibrium, bob 14 will continually be making and breaking contact with the surface of filter cake 10 and the period of time during which magnetic block valve 25 is open will be equal to the period of time during which magnetic block valve 28 is open. It will be apparent that the rate at which the speed of rotation of filter discs 2 changes can be adjusted by adjusting the bleed rates of constant flow rate controllers 34 and 38. The bleed rates should be low enough to avoid undesirably large excursions in filter speeds and yet large enough to bring filter cake 10 to the desired fixed level in a reasonable amount of time.

The purpose of providing a back or minimum pressure in air discharge line 37 is to prevent filter discs 2 from rotating at too low a speed which, under some circumstances, would result in excessive and undesirable thicknesses of filter cake on the said filter discs 2.

As the filter cake 10 is produced and stripped off filter discs 2, it drops into filter bin 8, striking bob 14 and causing it to sway slightly. If bob 14 were suspended by means of a rigid, fixed cable or rod, excessive stresses on the support means may, under some circumstances, result and cause the same to break. It is preferred to suspend bob 14 by means of the free-swinging, non-rigid cable 13 so as to better withstand stresses induced by the falling filter cake 10.

It will be seen from all of the foregoing that effective and reliable means employing a single probe has been provided to accurately maintain the level of filter cake in a filter bin served by a rotary filter.

While I have shown the best embodiment of my invention now known to me, I do not wish to be limited to the exact construction herein shown and described, and my invention is to be construed as covering modifications, equivalents and substitutions coming within the scope of the appended claims.

For instance, instead of controlling the speed of rotation of filter 1 whereby to regulate the amount of material in bin 8, the speed of belt conveyor 9 can be controlled to regulate the rate of withdrawal of material from bin 8 and hence to regulate the level of material therein. Thus, pneumatically controlled variable speed transmission 7 can operate belt conveyor 9, and the pneumatic signal from line 30, controlled by bob 14 as hereinabove described, can regulate the said pneumatically controlled variable speed transmission 7 to maintain a fixed level of material in bin 8. It will be apparent, of course, that in this particular arrangement, the material entering bin 8 need not come from a filter.

Also, the amount of material in bin 8 can be regulated by regulating the rate of withdrawal of material from another bin feeding the said bin 8. Thus, pneumatically controlled variable speed transmission 30 can operate another belt conveyor withdrawing material from another bin and feeding bin 8, the pneumatic signal from line 30, controlled by bob 14 in bin 8 as hereinabove described, regulating the said pneumatically controlled variable speed transmission 7 and thereby regulating the rate of withdrawal of material from the other bin and hence the feed rate of such material into bin 8.

I claim:

1. Apparatus for maintaining a fixed level of electrically conductive particulate material in a bin continuously fed particulate material from a source of particulate material by particulate material feed means driven by a variable speed transmission having a fluid-pressure operated speed control adapted to increase the transmission speed upon an increase in fluid pressure thereto and to decrease the transmission speed upon a decrease in fluid pressure thereto, a portion of said particulate material in said bin being withdrawn continuously from said bin, said apparatus comprising:
   (a) a source of compressed fluid,
   (b) compressed fluid tank means connected to said fluid pressure operated speed control,
   (c) first electrically operated bleed valve means interposed between said source of compressed fluid and said compressed fluid tank means and adapted to be opened to bleed compressed fluid from said source of compressed fluid into said compressed fluid tank means to increase the pressure therein or alternatively to be closed,
   (d) second electrically operated bleed valve means connected to said compressed fluid tank means and adapted to be opened to bleed compressed fluid from said compressed fluid tank means to decrease the pressure therein or alternatively to be closed,
   (e) probe means in said bin at a fixed level above the bottom thereof and adapted to make or alternatively to break electrical contact with the particulate material therein,
   (f) electric relay means having an electric circuit comprising said probe means and said particulate material, which electric circuit is closed when said probe means contacts said particulate material and opened when said probe means breaks contact with said particulate material, said electric circuit operating said electric relay means to open said first bleed valve means and close said second bleed valve means when the particulate material in the bin falls below the fixed level or alternatively to close said first bleed valve means and open said second bleed valve means when the particulate material in said bin rises above the fixed level.

2. Apparatus as in claim 1, further comprising:
   g) means operatively associated with said compressed fluid tank means to maintain at least a minimum fluid pressure therein.

3. Apparatus as in claim 1, further comprising:
   (g) means connected to the discharge of said second bleed valve means to maintain at least a minimum fluid back pressure thereon.

4. Apparatus for maintaining a fixed level of electrically conductive particulate material in a bin continuously fed particulate material from a source of particulate material by particulate material feeding means driven by a variable speed transmission having a pneumatically operated speed control adapted to increase the transmission speed upon an increase in air pressure thereto and to decrease the transmission speed upon a decrease in air pressure thereto, a portion of said particulate material in said bin being withdrawn continuously from said bin, said apparatus comprising:
   (a) a source of compressed air,
   (b) a compressed air tank connected to said pneumatically operated speed control,
   (c) first bleed valve means interposed between said source of compressed air and said compressed air tank to bleed compressed air from said source of compressed air into said compressed air tank to increase the pressure therein,
   (d) second bleed valve means connected to said compressed air tank to bleed compressed air from said compressed air tank to decrease the pressure therein,
   (e) first electrically operated valve means associated with said first bleed valve means and adapted to be opened to permit the flow of compressed air into said compressed air tank or alternatively to be closed,
   (f) second electrically operated valve means associated with said second bleed valve means and adapted to be opened to permit the flow of compressed air from said compressed air tank or alternatively to be closed,
   (g) only one probe in said bin at a fixed level above the bottom thereof and adapted to make or alternatively to break electrical contact with the particulate material therein,
   (h) an electric relay having an electric circuit comprising said probe and said particulate material, which electric circuit is closed when said probe contacts said particulate material and opened when said probe breaks contact with said particulate material, said electric circuit operating said electric relay to open said first electrically operated valve and close said second electrically operated valve when the particulate material in the bin falls below the fixed level or alternatively to close said first electrically operated valve and open said second electrically operated valve when the particulate material in the bin rises above the fixed level.

5. Apparatus as in claim 4, further comprising:
   (i) means operatively associated with said compressed air tank to maintain at least a minimum air pressure therein.

6. Apparatus as in claim 4, further comprising:
   (i) means associated with the second bleed valve means to maintain at least a minimum air back pressure thereon.

7. Apparatus for maintaining a fixed level of electrically conductive particulate material in a bin continuously receiving particulate material from a source of particulate material, a portion of said particulate material in said bin being withdrawn continuously from said bin by particulate material removal means driven by a variable speed transmission having a fluid-pressure operated speed control adapted to increase the transmission speed upon an increase in fluid pressure thereto and to decrease the transmission speed upon a decrease in fluid pressure thereto, said apparatus comprising:
   (a) a source of compressed fluid,
   (b) compressed fluid tank means connected to said fluid pressure operated speed control,
   (c) first electrically operated bleed valve means interposed between said source of compressed fluid and said compressed fluid tank means and adapted to be opened to bleed compressed fluid from said source of compressed fluid into said compressed fluid tank means to increase the pressure therein or alternatively to be closed,
   (d) second electrically operated bleed valve means connected to said compressed fluid tank means and adapted to be opened to bleed compressed fluid from said compressed fluid tank means to decrease the pressure therein or alternatively to be closed, (e) probe means in said bin at a fixed level above the bottom thereof and adapted to make or alternatively to break electrical contact with the particulate material therein, (f) electric relay means having an electric circuit comprising said probe means and said particulate material in said bin, which electric circuit is closed when said probe means contacts said particulate material and opened when said probe means breaks contact with said particulate material, said electric circuit operating said electric relay means to open said second bleed valve means and close said first bleed valve means when the particulate material in the bin falls below the fixed level or alternatively to close said second bleed valve means and open said first bleed valve means when the particulate material in the bin rises above the fixed level.

8. Apparatus as in claim 7, further comprising:
(g) means operatively associated with said compressed fluid tank means to maintain at least a minimum fluid pressure therein.

9. Apparatus as in claim 7, further comprising:
(g) means connected to the discharge of said second bleed valve means to maintain at least a minimum fluid back pressure thereon.

10. Apparatus for maintaining a fixed level of electrically conductive particulate material in a bin continuously receiving particulate material from a source of particulate material, a portion of said particulate material in said bin being withdrawn continuously from said bin by particulate material removal means driven by a variable speed transmission having a pneumatically operated speed control adapted to increase the transmission speed upon an increase in air pressure thereto and to decrease the transmission speed upon a decrease in air pressure thereto, said apparatus comprising:

(a) a source of compressed air,
(b) a compressed air tank connected to said pneumatically operated speed control,
(c) first bleed valve means interposed between said source of compressed air and said compressed air tank to bleed compressed air from said source of compressed air into said compressed air tank to increase the pressure therein,
(d) second bleed valve means connected to said compressed air tank to bleed compressed air from said compressed air tank to decrease the pressure therein,
(e) first electrically operated valve means associated with said first bleed valve means and adapted to be opened to permit the flow of compressed air into said compressed air tank or alternatively to be closed,
(f) second electrically operated valve means associated with said second bleed valve means and adapted to be opened to permit the flow of compressed air from said compressed air tank or alternatively to be closed,
(g) only one probe in said bin at a fixed level above the bottom thereof and adapted to make or alternatively to break electrical contact with the particulate material therein,
(h) an electric relay having an electric circuit comprising said probe and said particulate material, which electric circuit is closed when said probe contacts said particulate material and opened when said probe breaks contact with said particulate material, said electric circuit operating said electric relay to open said second electrically operated valve and close said first electrically operated valve when the particulate material in the bin falls below the fixed level or alternatively to close said second electrically operated valve and open said first electrically operated valve when the particulate material in the bin rises above the fixed level.

11. Apparatus as in claim 10, further comprising:
(i) means operatively associated with said compressed air tank to maintain at least a minimum air pressure therein.

12. Apparatus as in claim 10, further comprising:
(i) means associated with the second bleed valve means to maintain at least a minimum air back pressure thereon.

13. Apparatus for maintaining a fixed level of electrically conductive filter cake in a filter bin receiving filter cake from a rotary filter driven by a variable speed transmission having a fluid-pressure operated speed control adapted to increase the transmission speed upon an increase in fluid pressure thereto and to decrease the transmission speed upon a decrease in fluid pressure thereto, a portion of said filter cake being withdrawn continuously from said filter bin, said apparatus comprising:

(a) a source of compressed fluid,
(b) compressed fluid tank means connected to said fluid pressure operated speed control,
(c) first electrically operated bleed valve means interposed between said source of compressed fluid and said compressed fluid tank means and adapted to be opened to bleed compressed fluid from said source of compressed fluid into said compressed fluid tank means to increase the pressure therein or alternatively to be closed,
(d) second electrically operated bleed valve means connected to said compressed fluid tank means and adapted to be opened to bleed compressed fluid from said compressed fluid tank means to decrease the pressure therein or alternatively to be closed,
(e) probe means in said filter bin at a fixed level above the bottom thereof and adapted to make or alternatively to break electrical contact with the filter cake therein,
(f) electric relay means having an electric circuit comprising said probe means and said filter cake, which electric circuit is closed when said probe means contacts said filter cake and opened when said probe means breaks contact with said filter cake, said electric circuit operating said electric relay means to open said first bleed valve means and close said second bleed valve means when the filter cake in the filter bin falls below the fixed level or alternatively to close said first bleed valve means and open said second bleed valve means when the filter cake in the filter bin rises above the fixed level.

14. Apparatus as in claim 13, further comprising:
(g) means operatively associated with said compressed fluid tank means to maintain at least a minimum fluid pressure therein.

15. Apparatus as in claim 13, further comprising:
(g) means connected to the discharge of said second bleed valve means to maintain at least a minimum fluid back pressure thereon.

16. Apparatus as in claim 13, further comprising:
(g) free-swinging, non-rigid means suspending said probe means in said filter bin.

17. Apparatus for maintaining a fixed level of electrically conductive filter cake in a filter bin receiving filter cake from a rotary filter driven by a variable speed transmission having a pneumatically operated speed control adapted to increase the transmission speed upon an increase in air pressure thereto and to decrease the transmission speed upon a decrease in air pressure thereto, a portion of the filter cake being withdrawn continuously from said filter bin, said apparatus comprising:

(a) a source of compressed air,
(b) a compressed air tank connected to said pneumatically operated speed control,
(c) first bleed valve means interposed between said source of compressed air and said compressed air tank to bleed compressed air from said source of compressed air into said compressed air tank to increase the pressure therein, (d) second bleed valve means connected to said compressed air tank to bleed compressed air from said compressed air tank to decrease the pressure therein,
(e) first electrically operated valve means associated with said first bleed valve means and adapted to be opened to permit the flow of compressed air into said compressed air tank or alternatively to be closed,
(f) second electrically operated valve means associated with said second bleed valve means and adapted to be opened, to permit the flow of compressed air from said compressed air tank or alternatively to be closed,
(g) only one probe in said filter bin at a fixed level above the bottom thereof and adapted to make or alternatively to break electrical contact with the filter cake therein,
(h) an electric relay having an electric circuit comprising said probe and said filter cake, which electric circuit is closed when said probe contacts said filter cake and opened when said probe breaks contact with said filter cake, said electric circuit operating said electric relay to open said first electrically operated valve and close said second electrically operated valve when the filter cake in the filter bin falls below the fixed level or alternatively to close said first electrically operated valve and open said second electrically operated valve when the filter cake in the filter bin rises above the fixed level.

18. Apparatus as in claim 17, further comprising:
(i) means operatively associated with said compressed air tank to maintain at least a minimum air pressure therein.

19. Apparatus as in claim 17, further comprising:
(i) means associated with the second bleed valve means to maintain at least a minimum air back pressure thereon.

20. Apparatus as in claim 17, further comprising:
(i) a free-swinging, non-rigid electrically conductive wire suspending said probe in said filter bin.

21. Apparatus for maintaining a fixed level of electrically conductive material in a tank from which a portion of said electrically conductive material is continuously withdrawn, said apparatus providing a fluid-pressure signal to fluid-pressure operated means controlling the rate at which said electrically conductive material is introduced into said tank, said apparatus comprising:
(a) a source of compressed fluid,
(b) compressed fluid tank means connected to said fluid-pressure operated means,
(c) electrically operated valve means operatively associated with said compressed fluid tank means adapted to be placed in a first position to introduce compressed fluid from said source of compressed fluid into said compressed fluid tank means to increase the pressure therein or alternatively to be placed in a second position to discharge compressed fluid from said compressed fluid tank means to decrease the pressure therein,
(d) probe means in said tank at a fixed level above the bottom thereof and adapted to make or alternatively to break electrical contact with the electrically conductive material therein,
(e) electric relay means having an electric circuit comprising said probe means and said electrically conductive material, which electric circuit is closed when said probe means contacts said electrically conductive material and opened when said probe means breaks contact with said electrically conductive material, said electric circuit operating said electric relay means to place said valve means in said first position or alternatively in said second position.

22. Apparatus for maintaining a fixed level of electrically conductive material in a tank from which a portion of said electrically conductive material is continuously withdrawn, said apparatus providing a fluid-pressure signal to fluid-pressure operated means controlling the rate at which said electrically conductive material is introduced into said tank, said apparatus comprising:
(a) a source of compressed fluid,
(b) compressed fluid tank means connected to said fluid-pressure operated means,
(c) first electrically operated valve means operatively associated with said compressed fluid tank means and adapted to be opened to introduce compressed fluid from said source of compressed fluid into said compressed fluid tank means to increase the pressure therein or alternatively to be closed,
(d) second electrically operated valve means operatively associated with said compressed fluid tank means and adapted to be opened to discharge compressed fluid from said compressed fluid tank means to decrease the pressure therein or alternatively to be closed,
(e) probe means in said tank at a fixed level above the bottom thereof and adapted to make or alternatively to break electrical contact with the electrically conductive material therein,
(f) electric relay means having an electric circuit comprising said probe means and said electrically conductive material, which electric circuit is closed when said probe means contacts said electrically conductive material and opened when said probe means breaks contact with said electrically conductive material, said electric circuit operating said electric relay means to open said first valve means and close said second valve means or alternatively to open said second valve means and close said first valve means.

23. Apparatus for maintaining a fixed level of electrically conductive material in a tank from which a portion of said electrically conductive material is continuously withdrawn, said apparatus providing a fluid-pressure signal to fluid-pressure operated means controlling the rate at which said electrically conductive material is introduced into said tank, said apparatus comprising:
(a) a source of compressed fluid,
(b) compressed fluid tank means connected to said fluid-pressure operated means,
(c) electrically operated valve means operatively associated with said compressed fluid tank means adapted to be placed in a first position to introduce compressed fluid from said source of compressed fluid into said compressed fluid tank means to increase the pressure therein or alternatively to be placed in a second position to discharge compressed fluid from said compressed fluid tank means to decrease the pressure therein,
(d) only one probe in said tank at a fixed level above the bottom thereof and adapted to make or alternatively to break electrical contact with the electrically conductive material therein,
(e) electric relay means having an electric circuit comprising said probe and said electrically conductive material, which electric circuit is closed when said probe contacts said electrically conductive material and opened when said probe breaks contact with said electrically conductive material, said electric circuit operating said electric relay means to place said valve in said first position or alternatively in said second position.

24. Apparatus for maintaining a fixed level of electrically conductive material in a tank from which a portion of said electrically conductive material is continuously withdrawn, said apparatus providing a fluid-pressure signal to fluid-pressure operated means controlling the rate at which said electrically conductive material is introduced into said tank, said apparatus comprising:
(a) a source of compressed fluid, (b) compressed fluid tank means connected to said fluid-pressure operated means, (c) first electrically operated valve means operatively associated with said compressed fluid tank means and adapted to be opened to introduce compressed fluid from said source of compressed fluid into said compressed fluid tank means to increase the pressure therein or alternatively to be closed, (d) second electrically operated valve means operatively associated with said compressed fluid tank means and adapted to be opened to discharge compressed fluid from said compressed fluid tank means to decrease the pressure therein or alternatively to be closed, (e) only one probe in said tank at a fixed level above the bottom thereof and adapted to make or alternatively to break electrical contact with the electrically conductive material therein, (f) electric relay means having an electric circuit comprising said probe and said electrically conductive material, which electric circuit is closed when said probe contacts said electrically conductive material and opened when said probe breaks contact with said electrically conductive material, said electric circuit operating said electric relay means to open said first valve means and close said second valve means or alternatively to open said second valve means and close said first valve means.

25. Apparatus for maintaining a fixed level of electrically conductive material in a tank into which said electrically conductive material is continuously introduced, said apparatus providing a fluid-pressure signal to fluid-pressure operated means controlling the rate at which said electrically conductive material is withdrawn from said tank, said apparatus comprising:

(a) a source of compressed fluid, (b) compressed fluid tank means connected to said fluid-pressure operated means, (c) electrically operated valve means operatively associated with said compressed fluid tank means adapted to be placed in a first position to introduce compressed fluid from said source of compressed fluid into said compressed fluid tank means to increase the pressure therein or alternatively to be placed in a second position to discharge compressed fluid from said compressed fluid tank means to decrease the pressure therein, (d) probe means in said tank at a fixed level above the bottom thereof and adapted to make or alternatively to break electrical contact with the electrically conductive material therein, (e) electric relay means having an electric circuit comprising said probe means and said electrically conductive material, which electric circuit is closed when said probe means contacts said electrically conductive material and opened when said probe means breaks contact with said electrically conductive material, said electric circuit operating said electric relay means to place said valve means in said first position or alternatively in said second position.

26. Apparatus for maintaining a fixed level of electrically conductive material in a tank into which said electrically conductive material is continuously introduced, said apparatus providing a fluid-pressure signal to fluid-pressure operated means controlling the rate at which said electrically conductive material is withdrawn from said tank, said apparatus comprising:

(a) a source of compressed fluid, (b) compressed fluid tank means connected to said fluid-pressure operated means, (c) first electrically operated valve means operatively associated with said compressed fluid tank means and adapted to be opened to introduce compressed fluid from said source of compressed fluid into said compressed fluid tank means to increase the pressure therein or alternatively to be closed, (d) second electrically operated valve means operatively associated with said compressed fluid tank means and adapted to be opened to discharge compressed fluid from said compressed fluid tank means to decrease the pressure therein or alternatively to be closed, (e) probe means in said tank at a fixed level above the bottom thereof and adapted to make or alternatively to break electrical contact with the electrically conductive material therein, (f) electric relay means having an electric circuit comprising said probe means and said electrically conductive material, which electric circuit is closed when said probe means contacts said electrically conductive material and opened when said probe means breaks contact with said electrically conductive material, said electric circuit operating said electric relay means to open said first valve means and close said second valve means or alternatively to open said second valve means and close said first valve means.

27. Apparatus for maintaining a fixed level of electrically conductive material in a tank into which said electrically conductive material is continuously introduced, said apparatus providing a fluid-pressure signal to fluid-pressure operated means controlling the rate at which said electrically conductive material is withdrawn from said tank, said apparatus comprising:

(a) a source of compressed fluid, (b) compressed fluid tank means connected to said fluid-pressure operated means, (c) electrically operated valve means operatively associated with said compressed fluid tank means adapted to be placed in a first position to introduce compressed fluid from said source of compressed fluid into said compressed fluid tank means to increase the pressure therein or alternatively to be placed in a second position to discharge compressed fluid from said compressed fluid tank means to decrease the pressure therein, (d) only one probe in said tank at a fixed level above the bottom thereof and adapted to make or alternatively to break electrical contact with the electrically conductive material therein, (e) electric relay means having an electric circuit comprising said probe and said electrically conductive material, which electric circuit is closed when said probe contacts said electrically conductive material and opened when said probe breaks contact with said electrically conductive material, said electric circuit operating said electric relay means to place said valve in said first position or alternatively in said second position.

28. Apparatus for maintaining a fixed level of electrically conductive material in a tank into which said electrically conductive material is continuously introduced, said apparatus providing a fluid-pressure signal to fluid-pressure operated means controlling the rate at which said electrically conductive material is withdrawn from said tank, said apparatus comprising:

(a) a source of compressed fluid, (b) compressed fluid tank means connected to said fluid-pressure operated means, (c) first electrically operated valve means operatively associated with said compressed fluid tank means and adapted to be opened to introduce compressed fluid from said source of compressed fluid into said compressed fluid tank means to increase the pressure therein or alternatively to be closed, (d) second electrically operated valve means operatively associated with said compressed fluid tank means and adapted to be opened to discharge compressed fluid from said compressed fluid tank means to decrease the pressure therein or alternatively to be closed, (e) only one probe in said tank at a fixed level above the bottom thereof and adapted to make or alternatively to break electrical contact with the electrically conductive material therein, (f) electric relay means having an electric circuit comprising said probe and said electrically conductive material, which electric circuit is closed when said probe contacts said electrically conductive material and opened when said probe breaks contact with said electrically conductive material, said electric circuit operating said electric relay means to open said first valve means and close said second valve means or alternatively to open said second valve means and close said first valve means.

References Cited by the Examiner

UNITED STATES PATENTS

| 2,164,796 | 7/1939 | Bird | 222—55 |
| 2,183,026 | 12/1939 | Mason | 222—56 |
| 3,095,097 | 6/1963 | Mellow | 222—56 X |

LOUIS J. DEMBO, *Primary Examiner.*

HADD S. LANE, *Examiner.*